(12) United States Patent
Choi

(10) Patent No.: US 9,487,060 B2
(45) Date of Patent: Nov. 8, 2016

(54) AIR CONDITIONING CONTROL APPARATUS FOR A VEHICLE

(71) Applicant: Hyundai Motor Company, Seoul (KR)

(72) Inventor: Hyunwoo Choi, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 370 days.

(21) Appl. No.: 14/327,300

(22) Filed: Jul. 9, 2014

(65) Prior Publication Data
US 2015/0165867 A1 Jun. 18, 2015

(30) Foreign Application Priority Data
Dec. 13, 2013 (KR) .......................... 10-2013-0155558

(51) Int. Cl.
*G05D 23/22* (2006.01)
*B60H 1/00* (2006.01)

(52) U.S. Cl.
CPC ....... *B60H 1/00757* (2013.01); *B60H 1/00828* (2013.01)

(58) Field of Classification Search
CPC ................... F24F 2011/0053; F24F 11/0079; B60H 2001/006; B60H 1/00757; B60H 1/0828; B60H 1/00735; B60H 2001/3282; B60H 2500/12; B60H 2600/11; B60H 2600/112; F25B 2500/12; F25B 2600/11; F25B 2600/112
See application file for complete search history.

(56) References Cited

U.S. PATENT DOCUMENTS

| 2010/0080399 A1* | 4/2010 | Pfau ................... B60H 1/00764 381/71.4 |
| 2011/0010015 A1* | 1/2011 | Jordan ............... B60H 1/00735 700/280 |
| 2014/0190678 A1* | 7/2014 | Dage .................. B60H 1/00828 165/202 |
| 2015/0093981 A1* | 4/2015 | Fusco ................ B60H 1/00792 454/75 |

FOREIGN PATENT DOCUMENTS

| JP | H09121238 A | 5/1997 |
| JP | 11-298574 | 10/1999 |
| JP | 2000-264035 A | 9/2000 |
| JP | 2003-202896 A | 7/2003 |
| KR | 10-2007-0034792 A | 3/2007 |
| KR | 10-0801340 B1 | 2/2008 |
| KR | 10-08013408 | 2/2008 |
| KR | 10-2013-0049938 | 5/2013 |

* cited by examiner

*Primary Examiner* — Leonard Chang
*Assistant Examiner* — Amanda P Setiawan
(74) *Attorney, Agent, or Firm* — Mintz Levin Cohn Ferris Glovsky and Popeo, P.C.; Peter F. Corless

(57) ABSTRACT

An air conditioning control apparatus for a vehicle includes a call monitor that monitors a phone call in the vehicle; a timer that counts a preset time; a driver that adjusts an air volume of an air conditioning apparatus in the vehicle; and a controller that controls the driver to set the air volume of the air conditioning apparatus as a reference value if the call monitor recognizes the occurrence of a phone call, and control the driver to increase the air volume of the air conditioning apparatus up to a user setting value in order from a low level to a high level if the phone call is maintained during the preset time.

10 Claims, 3 Drawing Sheets

AIR CONDITIONING CONTROL APPARATUS FOR A VEHICLE

CROSS-REFERENCE TO RELATED APPLICATION

This application is based on and claims under 35 U.S.C. §119(a) priority from Korean Patent Application No. 10-2013-0155558, filed on Dec. 13, 2013 in the Korean Intellectual Property Office, the disclosure of which is incorporated herein in its entirety by reference.

BACKGROUND (a) Field of the Invention

The present invention relates to an air conditioning apparatus for a vehicle, and more particularly, to a technology for efficiently using a voice recognition function and a hands-free call function of a vehicle mounted multimedia device (e.g., navigation system, head unit, etc.), in an environment in which noise is generated by an air conditioning apparatus (e.g., air conditioner, heater, etc.).

(b) Description of the Related Art

Although a hands-free device which enables an occupant of a vehicle (e.g., a person driving the vehicle or a passenger) to conveniently make or receive a telephone call without holding a portable phone is widely utilized, it may be difficult for the occupant to hear on a call, due to background noise in a vehicle.

In particular, while a vehicle air conditioning apparatus is operated in which an air volume is adjusted by operating a blower motor, the noise of the vehicle air conditioning apparatus may disturb a phone call of an occupant, so the occupant performs an operation of reducing the air volume of the vehicle air conditioning apparatus.

Even though the phone call is connected using a hands-free device while driving the vehicle, in the situation that it is necessary to operate the vehicle air conditioning apparatus due to a phone call, the operation in which an occupant directly adjusts the air conditioning apparatus to decrease the noise of the air conditioning apparatus can distract the attention of the occupant (in particular, the person driving the vehicle) and possibly result in an accident.

To address these problems, conventional technology which decreases the air volume of the air conditioning apparatus below a certain level is proposed, but, if the call is prolonged, the temperature in the vehicle is not properly maintained, so the temperature may cause discomfort for the vehicle occupant.

SUMMARY

An object of the present invention is to provide an air conditioning control apparatus for a vehicle capable of maintaining the proper temperature in the vehicle, by setting an air volume of an air conditioning apparatus as a reference value if a phone call in the vehicle is detected, and by slowly increasing the air volume of the air conditioning apparatus if the phone call is maintained during a preset time or if the phone call is maintained even though the temperature in the vehicle exceeds a preset temperature range.

In order to achieve the above object, an air conditioning control apparatus for a vehicle according to the present invention comprises a call monitor configured to monitor a phone call in the vehicle; a timer configured to count a preset time; a driver configured to adjust an air volume of an air conditioning apparatus in the vehicle; and a controller configured to control the driver to set the air volume of the air conditioning apparatus as a reference value depending on recognition of the phone call in the vehicle by the call monitor, and control the driver to increase the air volume of the air conditioning apparatus up to a user setting value in order from a low level to a high level if the phone call is maintained during the preset time.

In order to achieve the above object, another air conditioning control apparatus for a vehicle according to the present invention comprises a call monitor configured to monitor a phone call in the vehicle; a temperature detector configured to detect a temperature in the vehicle; a driver configured to adjust an air volume of an air conditioning apparatus in the vehicle; and a controller configured to control the driver to set the air volume of the air conditioning apparatus as a reference value depending on recognition of the phone call in the vehicle by the call monitor, and control the driver to increase the air volume of the air conditioning apparatus up to a user setting value in order from a low level to a high level if the phone call is maintained and the temperature in the vehicle exceeds a preset temperature range.

The present invention as described above has the effects which can maintain the proper temperature in a vehicle, by setting air volume of an air conditioning apparatus as a reference value if the phone call in a vehicle is detected, and by slowly increasing the air volume of the air conditioning apparatus if the phone call is maintained during a preset time or if the phone call is maintained even though the temperature in the vehicle exceeds the preset temperature range.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, preferred embodiment according to the present invention will be described in detail with reference to the accompanying drawings.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Figure 1:
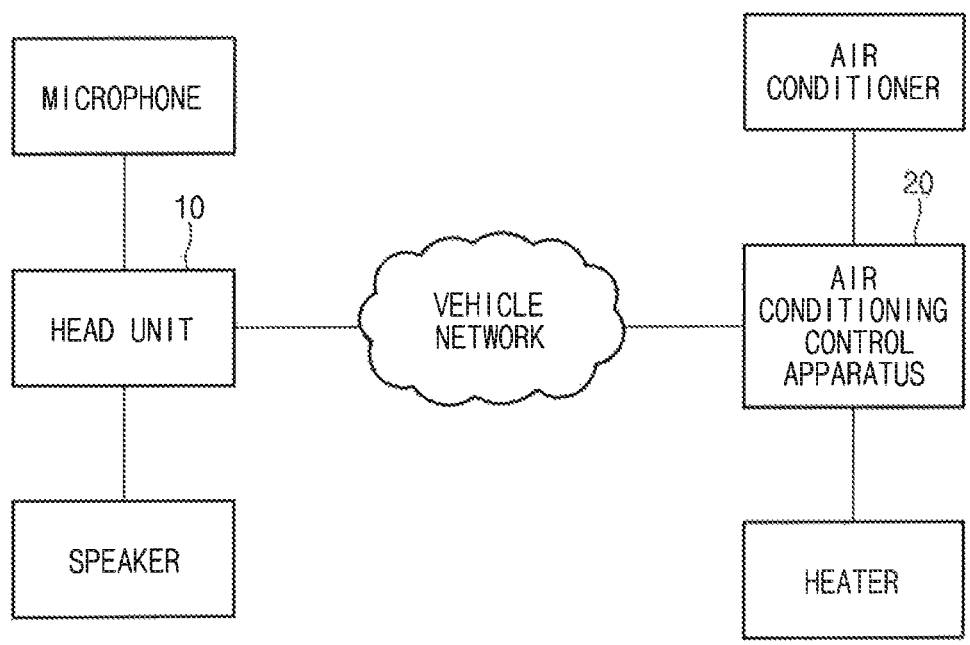
FIG. 1 is a block diagram of an embodiment of an air conditioning control system for a vehicle according to the present invention.

FIG. 1 is a block diagram of an embodiment of an air conditioning control system for a vehicle according to the present invention.

As shown in FIG. 1, an air conditioning control system for a vehicle according to the present invention includes a head unit 10 and air conditioning control apparatus 20.

The head unit 10 preferably is a vehicle mounted audio/navigation device and includes an interface accessible to a vehicle network, and thus if a voice recognition function is activated or a hands-free call function is activated, it may transmit information via the vehicle network to the air conditioning control apparatus 20.

Also, if a voice recognition function is inactivated or a hands-free call function is inactivated, the head unit 10 transmits information via the vehicle network to the air conditioning control apparatus 20.

The vehicle network may include a CAN (Controller Area Network), LIN (Local Interconnect Network), FlexRay, MOST (Media Oriented System Transport) and the like, and the present invention will be described as an example of CAN.

The head unit 10 preferably includes a microphone through which the voice of a driver is inputted for voice recognition or for a phone call, and a speaker for outputting the other party's voice during the phone call.

The air conditioning control apparatus 20 preferably is mounted on the vehicle and serves as a device for adjusting the temperature in the vehicle, controls the air conditioning apparatus (air conditioner and heater), and the like.

The air conditioning control apparatus 20 adjusts the air volume of the air conditioning apparatus based on an activation signal or an inactivation signal which is transmitted from the head unit 10 via the vehicle network.

In particular, the air conditioning control apparatus 20 decreases the air volume of the air conditioning apparatus from the user setting value to a reference value (for example, 50% of the maximum air volume) if a phone call by a vehicle occupant (i.e., a person driving the vehicle or a passenger) is detected in the vehicle, and slowly increases the air volume of the air conditioning apparatus up to the user setting value if the call is maintained during the preset time (for example, 2 minutes).

The air conditioning control apparatus 20 returns the air volume of the air conditioning apparatus to the user setting value which is the original set value if the phone call is terminated within the preset time. Here, the user setting value is higher than the reference value, and the air volume adjusting function is not performed if the setting value is lower than the reference value.

Also, the air conditioning control apparatus 20 decreases the air volume of the air conditioning apparatus from the user setting value to the reference value if the phone call by a vehicle occupant is detected, and slowly increases the air volume of the air conditioning apparatus up to the user setting value if the phone call is maintained and the temperature in the vehicle exceeds the preset temperature range (for example, about 20° C.~27° C.).

The air conditioning control apparatus 20 returns the air volume of the air conditioning apparatus to the user setting value which is the original set value if the phone call is terminated such that the temperature in the vehicle is within the preset temperature range.

In particular, the user setting value is higher than the reference value, and the air volume adjusting function is not performed if the setting value is lower than the reference value.

In the present invention, the meaning of the foregoing description by which the air volume of the air conditioning apparatus is slowly increased means that the level determining the strength of the air volume is gradually increased. For example, when the level having the air volume strength such as 1<2<3<4<5<6 exists, if the reference value is level 2, it is gradually increased from level 3.

Figure 2:
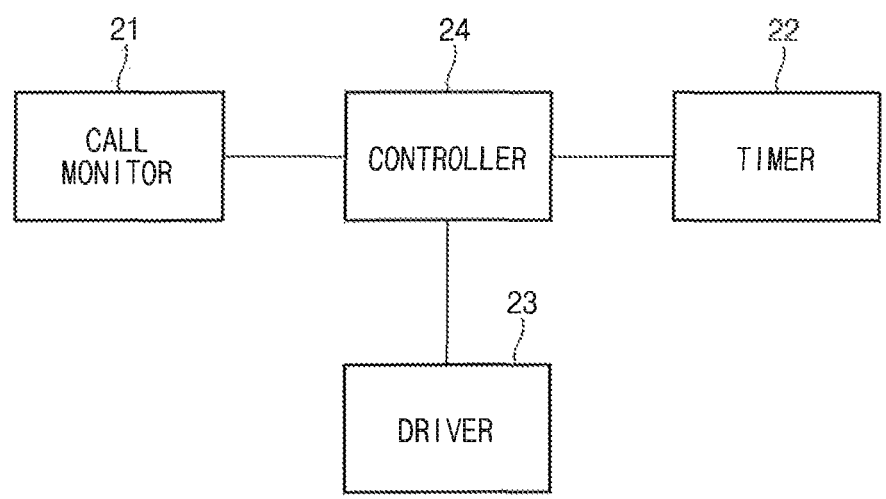
FIG. 2 is a block diagram of an embodiment of an air conditioning control apparatus for a vehicle according to the present invention.

FIG. 2 is a block diagram of an embodiment of an air conditioning control apparatus for a vehicle according to the present invention.

As shown in FIG. 2, the air conditioning control device for a vehicle according to the present invention includes a call monitor 21, a timer 22, a driver 23 and a controller 24. In particular, as used herein, the term "driver" refers to hardware and/or software used to adjust the air volume of the air conditioning apparatus.

Regarding the above components, first, the call monitor 21 recognizes a phone call in the vehicle through the vehicle network. That is, the call monitor 21 may recognize the operation status of the microphone through which a voice is inputted, based on an activation signal or an inactivation signal transmitted from the head unit 10.

Next, the timer 22 counts a preset time.

Then, the driver 23 adjusts the air volume of the air conditioning apparatus in the vehicle.

Finally, the controller 24 controls each of the components to normally perform their respective functions.

In particular, the controller 24 controls the driver 23 to set the air volume of the air conditioning apparatus as the reference value depending on the recognition of the phone call (including voice recognition) in the vehicle by the call monitor 21, and controls the driver 23 to increase the air volume of the air conditioning apparatus up to the user setting value in order from a low level to a high level if the phone call is maintained during the preset time.

At this time, the controller 24 controls the driver 23 to return the air volume of the air conditioning apparatus to the user setting value which is original status if the phone call is terminated within the preset time. In particular, the user setting value is higher than the reference value, and the air volume adjusting function is not performed by the controller 24 if the setting value is lower than the reference value.

Figure 3:
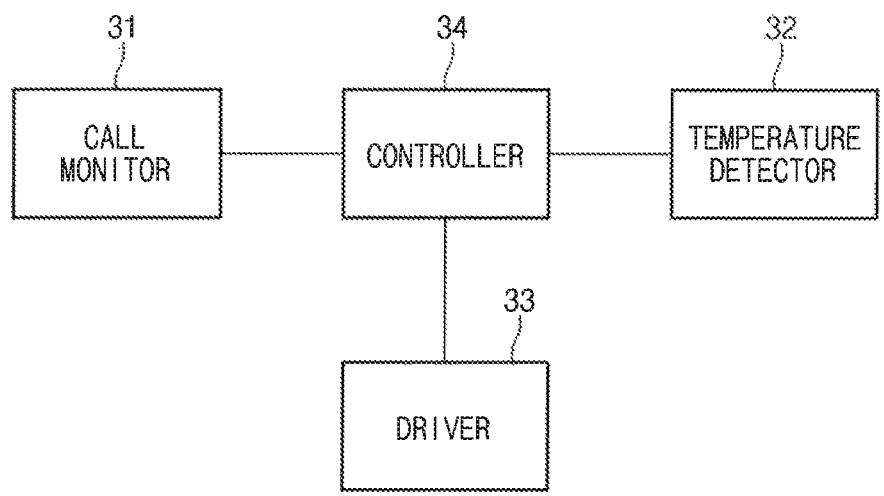
FIG. 3 is a block diagram of another embodiment of an air conditioning control apparatus for a vehicle according to the present invention.

FIG. 3 is a block diagram of another embodiment of an air conditioning control apparatus for a vehicle according to the present invention.

As shown in FIG. 3, the air conditioning control apparatus for a vehicle according to the present invention includes a call monitor 31, a temperature detector 32, a driver 33 and controller 34.

Regarding the above components, first, the call monitor 31 recognizes the phone call in the vehicle through the vehicle network. That is, the call monitor 31 may recognize the operation status of the microphone through which a voice is inputted, based on an activation signal or an inactivation signal transmitted from the head unit 10.

Next, a temperature detector 32 detects the temperature within the vehicle.

Then, the driver 33 adjusts the air volume of the air conditioning apparatus in the vehicle.

Finally, the controller 34 controls each of the components to normally perform their respective functions.

In particular, the controller 34 controls the driver 33 to set the air volume of the air conditioning apparatus as the reference value if the phone call (including voice recognition) in the vehicle is detected by the call monitor 31, and controls the driver 33 to increase the air volume of the air conditioning apparatus up to the user setting value in order from a low level to a high level if the phone call is maintained and the temperature in the vehicle exceeds the preset temperature range.

At this time, the controller 34 controls the driver 33 to return the air volume of the air conditioning apparatus to the user setting value which is original status if the phone call is terminated in the status that the temperature in the vehicle is within the preset temperature range. In particular, the user setting value is higher than the reference value, and the air volume adjusting function is not performed if the setting value is lower than the reference value.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. An air conditioning control apparatus for a vehicle, comprising:
   a call monitor configured to monitor a phone call in the vehicle;
   a timer configured to count a preset time;
   a driver configured to adjust an air volume of an air conditioning apparatus in the vehicle; and
   a controller configured to control the driver to set the air volume of the air conditioning apparatus as a reference value depending on recognition of the phone call in the vehicle by the call monitor, and control the driver to increase the air volume of the air conditioning apparatus up to a user setting value in order from a low level to a high level if the phone call is maintained during the preset time.

2. An air conditioning control apparatus for a vehicle according to claim 1, wherein the controller controls the driver to return the air volume of the air conditioning apparatus to the user setting value if the phone call is terminated within the preset time.

3. An air conditioning control apparatus for a vehicle according to claim 1, wherein the controller performs an air volume adjusting function if the user setting value is higher than the reference value.

4. An air conditioning control apparatus for a vehicle according to claim 1, wherein the call monitor monitors activation or inactivation of a microphone in the vehicle.

5. An air conditioning control apparatus for a vehicle according to claim 1, wherein the call monitor monitors the phone call in the vehicle through a CAN(Controller Area Network).

6. An air conditioning control apparatus for a vehicle, comprising:
   a call monitor configured to monitor a phone call in the vehicle;
   a temperature detector configured to detect a temperature in the vehicle;
   a driver configured to adjust an air volume of an air conditioning apparatus in the vehicle; and
   a controller configured to control the driver to set the air volume of the air conditioning apparatus as a reference value depending on recognition of the phone call in the vehicle by the call monitor, and control the driver to increase the air volume of the air conditioning apparatus up to a user setting value in order from a low level to a high level if the phone call is maintained and the temperature in the vehicle exceeds a preset temperature range.

7. An air conditioning control apparatus for a vehicle according to claim 6, wherein the controller controls the driver to return the air volume of the air conditioning apparatus to the user setting value if the phone call is terminated and the temperature in the vehicle is within the preset temperature range.

8. An air conditioning control apparatus for a vehicle according to claim 6, wherein the controller performs an air volume adjusting function if the user setting value is higher than the reference value.

9. An air conditioning control apparatus for a vehicle according to claim 6, wherein the call monitor monitors activation or inactivation of a microphone in the vehicle.

10. An air conditioning control apparatus for a vehicle according to claim 6, wherein the call monitor monitors the phone call in the vehicle through a CAN(Controller Area Network).

* * * * *